3,071,626
Patented Jan. 1, 1963

3,071,626
MIXED KETALS
George E. Ham, Lake Jackson, Tex., assignor to The Dow Chemical Company, Midland, Mich., a corporation of Delaware
No Drawing. Filed Feb. 10, 1961, Ser. No. 88,254
4 Claims. (Cl. 260—611)

The present invention relates to a new class of compounds and to a process for preparing the same. The compounds have a general formula:

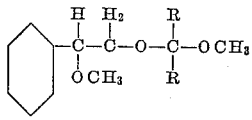

wherein each R independently represents hydrogen or an alkyl radical having from 1 to 4 carbon atoms and wherein the total carbon atoms in

is not more than 5. The new class of chemical compounds have been tested and found to be useful as the active ingredient in herbicide and insecticide compositions for the control of undesired vegetation and insects, respectively.

It has now been found that a compound having the above general formula can be prepared by reacting a dimethoxy alkane with 2-methoxy-2-phenylethanol in the presence of an acid form strong acid cation exchange resin (i.e. Dowex 50 or Amberlite IR120 acid form) at about the reflux temperature of the reaction mixture. Good yields are obtained when the reaction is carried out under substantially anhydrous conditions. The desired product is recovered from the reaction mixture in conventional manner such as distillation.

The starting acetals or ketals which have been found to be useful are the dimethoxy alkanes having from 1 to 5 carbon atoms in the alkane portion and having the methoxy groups either terminal (acetals) or intermediate the terminal carbon atoms (ketals). Then one can employ 1,1-dimethoxymethane, -ethane, -propane, -butane, or -pentane; 2,2-dimethoxypropane, -butane or -pentane; or 3,3-dimethoxy-pentane.

The acid form cation exchange resins which can be employed are the sulfonated styrene-divinylbenzene copolymers known in the trade as Dowex 50 acid form (produced by The Dow Chemical Company), Amberlite IR120–H+ (sold by Rohm and Haas Chemical Company) and the like. While substantially any acid catalyst is operative, that is $H_2SO_4$, HCl and the like, cation exchange resins are preferred because of ease of handling and reproducibility of results achieved when they are employed and lack of side reactions.

The following examples are representative of the present invention but are not to be construed as limiting:

EXAMPLE 1

Preparation of 2-Methoxy-2(2-Methoxy-2-Phenylethoxy)Propane 180 grams of Dry Dowex 50, acid form (a sulfonated cation exchange resin, sulfonated styrene-butadiene copolymer, manufactured by The Dow Chemical Company), was mixed with 2-methoxy-2-phenylethanol (450 g., 2.96 moles) and 2,2-dimethoxypropane (1800 g., 17.3 moles) and the mixture heated under reflux (76° C.) with stirring for three hours. All apparatus was dried and protected from atmospheric moisture with a $CaCl_2$ drying tube. After the reaction time was complete the mixture was filtered, several grams of $K_2CO_3$ added to the filtrate and the low-boiling material removed by distillation under vacuum. Distillation of the residue gave 500 ml. of material boiling at 90–110° C. at 2–3 mm. and 12 ml. of pot residue. The fraction (175 ml.) boiling at 110° C./2–3 mm. had the following properties: $n_D^{20}$ 1.4830; $d_{20}$ 1.002; MR found 63.92, MR calculated 63.56; percent acetone from hydrolysis: found 24.7%, calculated 25.9%. The fraction boiling between 90 and 110° C./2–3 mm. contained 50% of the desired mixed ketal, the remainder being unreacted methoxyphenylethanol. The yield of mixed ketal based on methoxyphenylethanol was 83.3% of the theoretical.

EXAMPLE 2

Preparation of 1-Methoxy-1-(2-Methoxy-2-Phenylethoxy)Propane

The dimethyl acetal of propionaldehyde (200 g., 1.92 moles) was mixed with 2-methoxy-2-phenylethanol (50 g., 0.329 mole) and 20 g. of Dry Dowex 50 resin acid form. The mixture was treated as described in Example 1. Distillation of the product gave 65 ml. of material boiling at 80° to 100° C. at 2 mm. The fraction with B.P. 100°/2 mm. was the desired product and had the following properties: $n_D^{20}$ 1.4827; $d_{20}$ 1.004; MR found 63.68, MR calculated 63.56; percent propionaldehyde from hydrolysis: found 24.4%, calculated 25.9%.

EXAMPLE 3

In the manner of Example 2, employing 2,2-dimethoxybutane in place of dimethyl acetal of propionaldehyde there is obtained 2-methoxy-2(2-methoxy-2-phenylethoxy)butane.

The new compounds have been tested and found to be useful as the active ingredient in compositions for the control of undesired vegetation and insects. In a representative operation 1-methoxy-1(2-methoxy-2-phenylethoxy)propane killed 50% of *Phytophthora infestans* when applied as the sole active ingredient in an insecticide composition containing 300 parts by weight of active ingredient per million parts by weight of aqueous composition. In another operation 75% of Anacharis sp. was killed when 2-methoxy-2(2-methoxy-2-phenylethoxy)propane was introduced into the water adjacent the growing vegetation in an amount to provide a concentration of about 100 parts per million parts of water.

I claim:
1. A mixed ketal having the formula

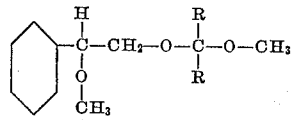

wherein each R represents an independently selected member from the group consisting of hydrogen, and alkyl radicals having from 1 to 4 carbon atoms, and the total carbon atoms in

being no more than 5.
2. 2-methoxy-2(2-methoxy-2-phenylethoxy)propane.
3. 1-methoxy-1(2-methoxy-2-phenylethoxy)propane.
4. A process for preparing a mixed ketal having the formula

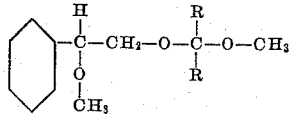

wherein each R represents an independently selected member from the group consisting of hydrogen and alkyl radicals having from 1 to 4 carbon atoms and the total carbon atoms in

being no more than 5, which comprises reacting by contacting 2-methoxy-2-phenylethanol with an excess over that theoretically required of a dimethoxy alkane having the formula

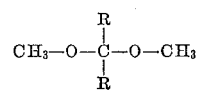

wherein each R has the aforesaid significance, in the presence of an acid form cation exchange resin catalyst at the reflux temperature of the reaction mixture and under substantially anhydrous conditions.

No references cited.